United States Patent [19]

Madabhushi

[11] Patent Number: 5,563,965
[45] Date of Patent: Oct. 8, 1996

[54] OPTICAL WAVEGUIDE DEVICE WITH ADDITIONAL ELECTRODE STRUCTURE

[75] Inventor: Rangaraj Madabhushi, Tokyo, Japan

[73] Assignee: NEC Corporation, Tokyo, Japan

[21] Appl. No.: 547,627

[22] Filed: Oct. 24, 1995

[30] Foreign Application Priority Data

Oct. 27, 1994 [JP] Japan .................. 6-263755

[51] Int. Cl.⁶ .................................................. G02F 1/035
[52] U.S. Cl. ........................ 385/2; 385/3; 385/8; 385/9
[58] Field of Search .................................. 385/2, 3, 8, 9

[56] References Cited

U.S. PATENT DOCUMENTS

| | | | |
|---|---|---|---|
| 5,050,948 | 9/1991 | Hawkins, II et al. | 385/2 |
| 5,138,480 | 8/1992 | Dolfi et al. | 385/2 |
| 5,214,724 | 5/1993 | Seino et al. | 385/2 |
| 5,339,369 | 8/1994 | Hopfer et al. | 385/2 |
| 5,416,859 | 5/1995 | Burns et al. | 385/3 |
| 5,455,876 | 10/1995 | Hopfer et al. | 385/2 |
| 5,502,780 | 3/1996 | Madabhushi | 385/2 |

FOREIGN PATENT DOCUMENTS

| | | |
|---|---|---|
| 2-051124 | 2/1990 | Japan . |
| 4-268531 | 9/1992 | Japan . |
| 6-095045 | 4/1994 | Japan . |
| 6-300994 | 10/1994 | Japan . |

OTHER PUBLICATIONS by M. Seino et al, "20–GHz 3dB–Bandwidth Ti:LiNbO₃ Machzehnder Modulator", *ECOC '90*, paper ThB22–5, pp. 433–436 (1989). (no month available).

"New Travelling–Wave Electrode Mach–Zehnder Optical Modulator With 20 GHz Bandwidth and 4.7V Driving Voltage At 1.52μm Wavelength", *Electronics Letters*, vol. 25, No. 20, pp. 1382–1382. Sep. 28, 1989.

"A Wide–Bank Ti:LiNBO₃ Optical Modulator with a Conventional Coplanar Waveguide Type Electrode", *IEEE Photonics. Tech. Lett.*, vol. 4, No. 9, pp. 1020–1022, 1922. Sep.

*Primary Examiner*—Rodney B. Bovernick
*Assistant Examiner*—Yisun Song
*Attorney, Agent, or Firm*—Young & Thompson

[57] ABSTRACT

At least one waveguide 2,3,4 are formed on a crystal substrate 1 having an electro-optical effect. A buffer layer 5 (with a dielectric constant of 1.1 to 40) is formed on the waveguide. Lower CPW electrode structures 6,7 are formed on the buffer layer. Intermediate electrode structures 8,9 are formed thereon and additional electrode structure 10 is formed on the intermediate signal electrode 8.

8 Claims, 6 Drawing Sheets

OPTICAL WAVEGUIDE DEVICE WITH ADDITIONAL ELECTRODE STRUCTURE

BACKGROUND OF THE INVENTION

The present invention relates to optical waveguide devices which can be utilized as high speed waveguide type optical modulator at 20 Gb/s and above in high speed optical communications, optical switch or exchange network, optical data processing, optical image processing and various other systems.

Waveguide type optical modulators and switches are most important key elements when realizing high speed optical communication, optical exchange network, optical data processing, optical image processing and various other systems. Waveguide type optical modulators have been fabricated on some interesting substrates by various methods. However, the optical waveguide devices mostly includes a $LiNnO_3$ substrate and a GaAs substrate. In-diffusion of titanium into $LiNbO_3$ is a convenient and relatively simple method of fabricating low-loss strip waveguide having satisfactory electro-optical characteristics on a substrate. Important parameters of the waveguide type modulator are drive power, modulation bandwidth and insertion loss. The bandwidth and drive power are in a trade-off relationship to each other. Research in waveguide type modulators is concentrated on optimizing the trade-off relation.

The bandwidth of a waveguide type modulator depends mainly on the type, material and shape of electrodes, and dielectric constant of substrate. For broad-band applications, travelling wave electrodes have been widely used. The travelling wave electrode is regarded to be an extension of drive transmission line. This means that the travelling wave electrode should have the same impedance as that of the source and cable. In this case, the modulation speed is limited by the difference in the transmission times (or phase velocities or effective refractive indexes) for the optical waves and microwaves.

There are two different travelling wave electrode structures that can be used, i.e., (1) ASL (Asymmetric Strip Line) or ACPS (Asymmetric Coplanar Strip) type structure and (2) CPW (Coplanar Waveguide) type structure. In order to increase the bandwidth, the effective microwave refractive index $n_m$ has to be reduced (from a value of 4.2) to be close to the effective optical reflective index $n_O$ (typically 2.2 in case of $LiNbO_3$ substrate).

Travelling wave modulator bandwidth is limited by phase velocity mismatch between microwaves and optical waves. This means that it is necessary to decrease the effective reflective index difference between microwaves and optical waves by reducing the effective microwave refractive index. One of the methods of reducing the effective microwave reflective index for increasing the bandwidth, is to use a thick electrode and buffer layer. Modulators using ASL or ACPS electrode structure have already been proposed, as shown in "33-GHz. cm Broadband Ti:LiNbO₃ Mack-Zehnder Modulator", ECOC' 89, paper ThB22-5, pp. 433–436 (1989). Such a modulator reduces the effective microwave refractive index using a large thickness film electrode (of ASL or ACPS electrode structure) and a buffer layer. A problem in the ASL or ACPS electrode structure is that the bandwidth is limited to about 12 GHz by microwave resonance problem due to the chip cross section. In order to increase the bandwidth above 20 GHz, the chip dimensions (both width and thickness) are reduced to about 0.6 mm. There is no problem in setting the chip thickness to about 0.6 mm. However, the demand for setting the chip width to about 0.6 mm poses problems during handling, mounting and packaging the chip.

Another method of reducing the effective microwave refractive index is to use an air layer that is formed by using a metal shield for the conventional travelling wave electrode structure. This is shown in "New Traveling-Wave Electrode Mach-Zehnder Optical Modulator with 20 GHz Bandwidth and 4.7 V Driving Voltage at 1.52 μm Wavelength", Elecronics Letters, Vol. 25, No. 20, pp. 1382–1383 (1989). A problem in this structure is that a special shield of metal cover having a groove should be fabricated in accurate dimensions. This requires a particularly difficult technique, increases the steps of manufacture and decreases permissible fabrication tolerances.

If the phase velocity mismatch between the microwaves and optical waves can be alleviated by either of the methods described above, the bandwidth of modulator/switch is further restricted by the microwave attenuation of the electrode structure. Even if there is perfect phase velocity match between the microwaves and optical waves, the ultimate bandwidth of the device is narrow unless the microwave attenuation is reduced. Generally, the microwave attenuation in device result from the following causes:

a) Conductor loss (which is a function of electrode material and parameter thereof);

b) Dielectric loss (which is a function of substrate properties);

c) Loss due to impedance mismatch between 50Ωsource and load;

d) Loss due to higher order mode propagation (more for the case with a CPW electrode); and e) Connector loss.

Thus, a new structure or design is necessary for high speed modulators which has a characteristic impedance of about 50Ω, substantially perfect phase velocity matching between microwaves and optical waves and low microwave attenuation. The new structure requires only extension of the general electrode fabrication process and ensures a simple fabrication process which does not require any extra special shield.

The inventors of the present invention earlier solved some of the above problems, and realized a wide-band modulator using a thick but conventional CPW electrode structure (a prior art example shown in FIGS. 5A and 5B, FIG. 5A being a plan view, and FIG. 5B showing a sectional view taken along line A–A' in FIG. 5A). This modulator is disclosed in "A wide-band Ti:NbO₃ Optical Modulator with a Conventional Coplanar Waveguide Type Electrode", IEEE Photonics. Tech. Lett. Vol. 4, No. 9, pp. 1020–1022, 1992. According to this research, the effective microwave refractive index $n_m$ can be reduced from a value of 4.2 to be close to the effective refractive index $n_o$ (typically a value of 2.2 in case of $LiNbO_3$ substrate). This can be realized with suitable design in the material and thickness of the buffer layer and material and thickness of the electrode. The inventors of the present application alleviated the microwave attenuation of the structure by reducing the microwave loss due to higher order mode propagation. This could be realized by reducing the chip thickness from 0.8 mm to 0.2 mm. Consequently, a wide-band modulator could be obtained.

It is further required to reduce the conductor loss of the CPW electrode. The reduction of conductor loss reduces attenuation of all microwaves of device to permit obtaining a high-speed (wide-band) modulator/switch.

In the specification of Japanese Patent Laidopen No. Heisei 6-300994 filed by the present applicant shown in FIGS. 6A and 6B, FIG. 6A being a plan view and FIG. 6B being a sectional view taken along line A-A' in FIG. 6B, an additional electrode structure (upper electrode structure) is used in addition to the existing electrode structure (lower and middle structure), thus reducing the conductor loss to increase the bandwidth. The ratio between the signal electrode width and the gap between the signal electrode and the ground electrode is maintained in the additional electrode structure in order to keep the characteristic impedance constant. The characteristic impedance is reduced due to the problem of the "edge effect"(i.e., the edge of the additional upper signal electrode being too close to the edge of the lower/intermediate ground electrode).

SUMMARY OF THE INVENTION

This problem can be solved according to the present invention. The present invention is useful for reducing the microwave attenuation of the device and increasing the bandwidth without adversely affecting the characteristic impedance.

The optical waveguide device according to the present invention comprises at least one waveguide formed on a crystal substrate having an electro-optical effect, a buffer layer (with a dielectric constant of 1.1 to 40) formed on the waveguide, and two three-electrode set stages (lower and intermediate structures) formed on the buffer layer, the electrode sets each including a signal electrode, two ground electrodes (known as CPW electrode structure) surrounding the signal electrode, and additional electrode structures (intermediate and upper electrode structures) which are the same or slightly greater in dimensions than the lower and intermediate electrode structures. The formation of the additional electrode structures has an effect of increasing the overall volume of the signal electrode to reduce the resistance and overall microwave attenuation, thus increasing the bandwidth. It is thus possible to realize a high speed, low driving voltage optical modulator.

According to the present invention, by forming the additional intermediate signal electrode structure on the intermediate signal electrode, the overall signal electrode volume is increased to reduce resistance and reduce overall microwave attenuation, thus increasing the bandwidth.

Since the width of the additional intermediate electrode is the same as the width of the intermediate electrode, the "edge effect" (i.e., very close approximation of edge of the lower and intermediate ground electrodes by the edge of the additional upper signal electrode) can be reduced to a large extent, and thus the characteristic impedance of the CPW structure is not adversely affected. It is also possible to control the effective microwave index by controlling the thickness, width, and gap of the additional electrode structure, so that it reaches the value of the effective optical index, which also increases the bandwidth.

DETAILED DESCRIPTION OF THE PREFERRED EMBODIMENTS

Figure 1A:
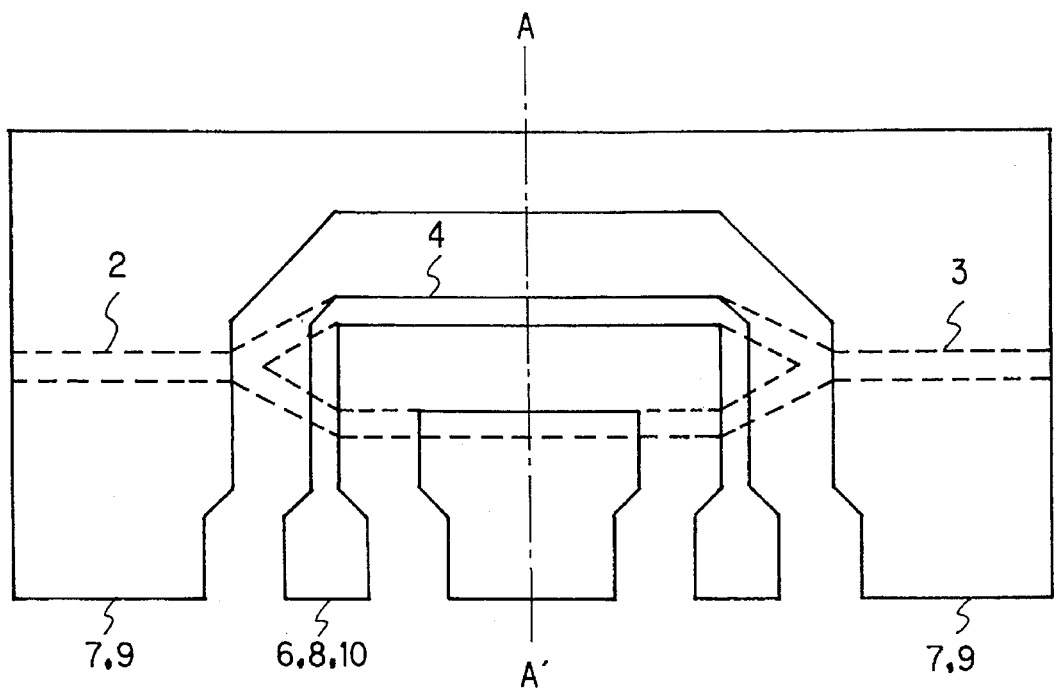
FIGS. 1A and 1B show a plan view and a sectional view taken along line A-A' in FIG. 1A of a basic structure of device according to the present invention.
Figure 1B:
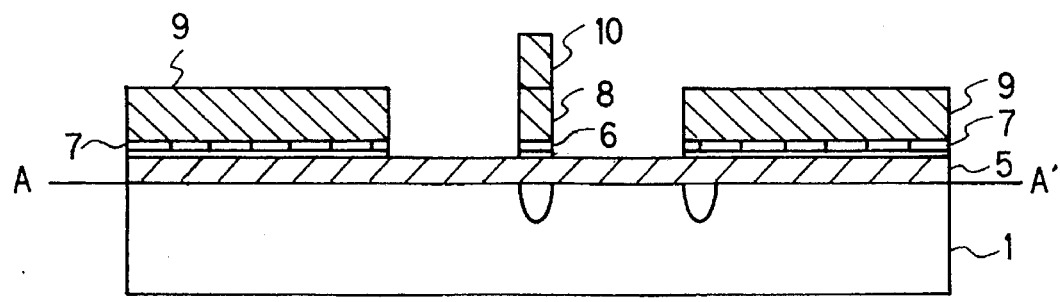

FIGS. 1A and 1B show the basic structure of device according to the present invention, FIG. 1A being a plan view, and FIG. 1B being a sectional view taken along line A-A' in FIG. 1A. As shown, waveguides 2 to 4 having a width of 5 to 15 μm and a depth of 3 to 15 μm are formed on a crystal substrate 1 having electro-optical effect. These waveguides 2 to 4 are formed by depositing a titanium metal film having a width of 3 to 12 μm and causing diffusion of the film in the crystal substrate at 900° to 1,100° C. for 5 to 12 hours. They comprise two Y branch waveguides 2 and 3 and a phase shifter 4. They are covered by a buffer layer 5 (dielectric layer having a dielectric constant of 1.1 to 40). On the buffer layer 5 are formed lower CPW electrode structures 6 and 7 comprising titanium metal (or chromium metal) of several hundred Å in thickness and gold of several thousand Å in thickness. On these lower CPW electrode structures 6 and 7 intermediate CPW electrode structures 8 and 9 of gold are formed by electro-plating. The lower and intermediate CPW electrode structures are formed by signal electrodes 6 and 8 having a width of 5 to 20 μm, a length of 10 to 70 mm and a thickness of 3 to 40 μm and ground electrodes 7 and 9 having a width of 100 to 9000 μm, a length of 10 to 70 mm and a thickness of 3 to 40 μm. On the intermediate signal electrode 8, an additional intermediate electrode 10 having the same dimensions is formed.

In this embodiment, by forming the additional intermediate signal electrode structure above the intermediate signal electrode, the overall volume of the signal electrode is increased, thereby reducing the resistance and reducing the total microwave attenuation, which in turn increases the bandwidth.

As the width of the additional intermediate signal electrode is the same as that of the intermediate electrode, the "edge effect" (i.e., the edges of the additional upper signal electrode being too close to the edges of the lower/intermediate ground electrodes) can be reduced to a large extent and the characteristic impedance of the CPW structure is not affected adversely. It is also possible to control the effective microwave index by controlling the thickness, width, and gap of the additional electrode structure, so that it reaches the value of the optical effective index, which also increases the bandwidth. Hence, a high-speed low driving voltage optical modulator can be realized.

Figure 2A:
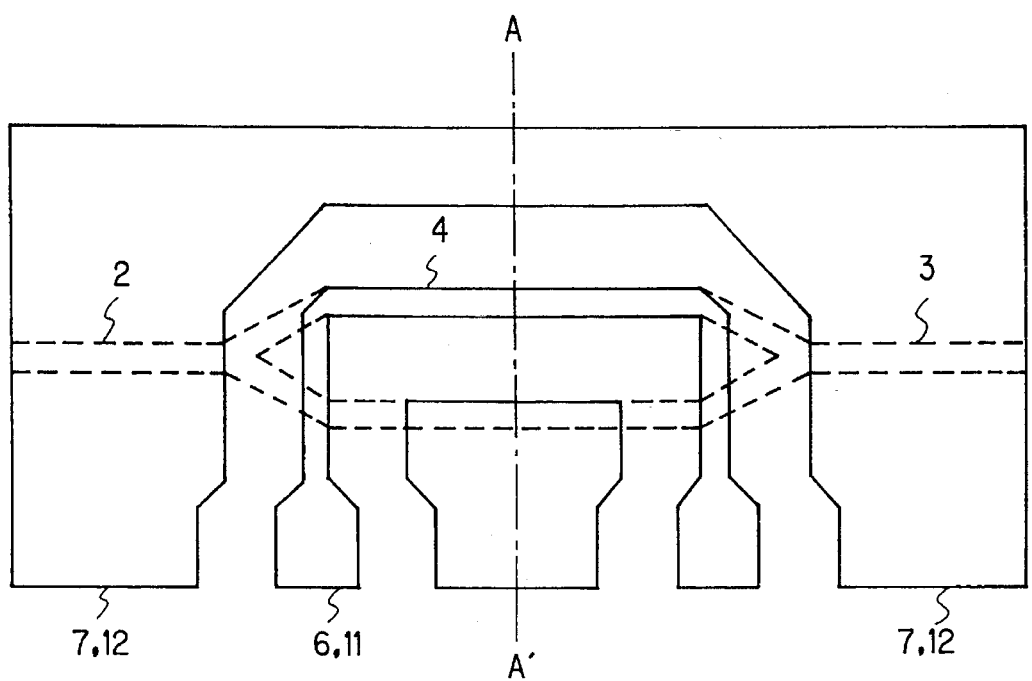
FIGS. 2A and 2B show a plan view and a sectional view taken along line A-A' in FIG. 2A of a second embodiment according to the present invention.
Figure 2B:
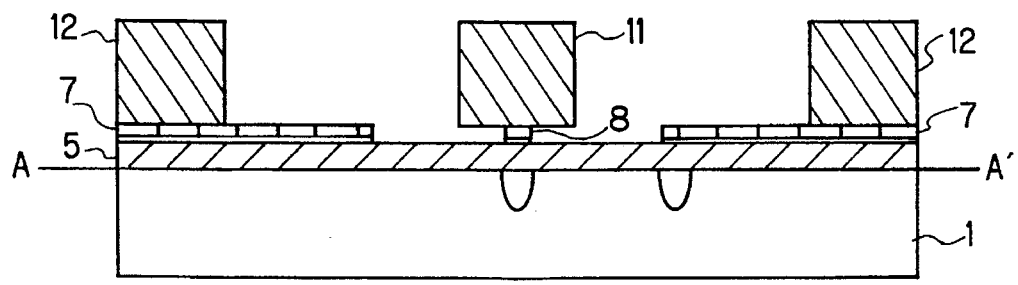

FIGS. 2A and 2B show another basic structure of device according to the present invention, FIG. 2A being a plan view, and FIG. 2B being a sectional view taken along line A-A' in FIG. 2A. Waveguides 2 to 4 having a width of 5 to 15 μm and a depth of 3 to 15 μm are formed on a crystal substrate 1 having electro-optical effect. These waveguides are formed by depositing titanium metal film having a width of 3 to 12 μm and causing diffusion of the film into the crystal substrate at 900° to 1,100° C. for 5 to 12 hours. These waveguides form Y-branch waveguides 2 and 3 and a phase shifter 4. They are covered by a buffer layer 5 (dielectric layer having a dielectric constant of 1.1 to 40) having a thickness of 0.3 to 10 μm. On the buffer layer are formed lower CPW electrode structures 7 and 8 comprising titanium metal (chromium metal) of several hundred Å in thickness and gold of several thousand Å in thickness. The lower electrode structures comprise a signal electrode 8 having a width of 5 to 20 μm and a length of 10 to 70 μm and two ground electrodes 7 having a width of 100 to 9,000 μm and a length of 10 to 70 μm. Additional upper electrode structures 11 and 12 are then formed, which comprise a signal electrode 11 having a width of 20 to 50 μm, a length of 10 to 70 mm and a thickness of 10 to 40 μm and two ground electrodes 12 having a width of 100 to 9,000 μm, a length of 10 to 70 mm and a thickness of 10 to 40 μm. They are formed by electro-plating.

According to the embodiment, by the provision of the additional upper electrode structures on the lower electrode structures, the overall signal electrode volume is increased to reduce the resistance and overall microwave attenuation, thus increasing the bandwidth.

Figure 6A:
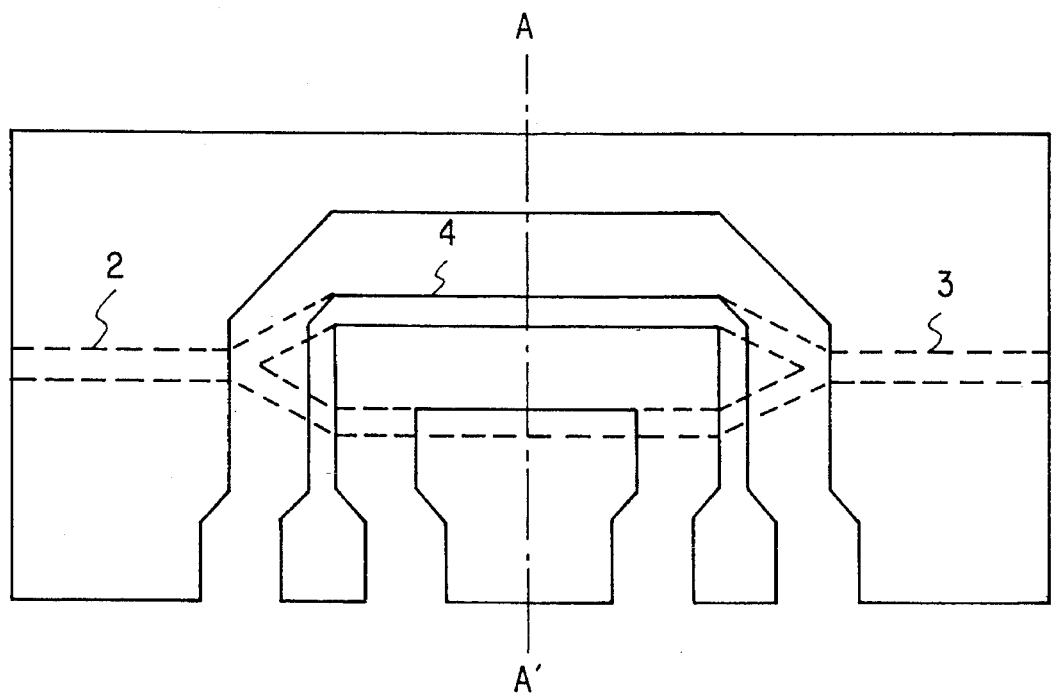
FIGS. 6A and 6B show a plan view and a sectional view taken along line A-A' in FIG. 6A of another device.
Figure 6B:
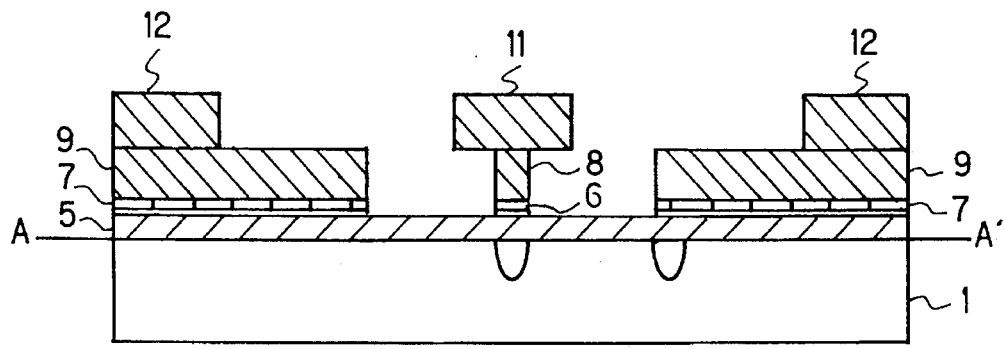

The upper electrode structures are greater in thickness than the lower electrode structures and are similar to those of FIGS. 6A and 6B. However, the removal of the intermediate electrode structure in FIGS. 6A and 6B has an effect of considerably reducing adverse effects on the CPW structure characteristic impedance due to too close walls of the upper signal electrode and lower ground electrode to one another. Although the upper signal electrode is close to the lower signal electrode, the problem of characteristic impedance changes is considerably reduced owing to the thickness difference between the upper and lower electrode structures, i.e., owing to the fact that the upper electrode structure thickness (about several ten μm) is greater than the lower electrode structure thickness (about several hundred to several thousand Å). Thus, the "edge effect" (i.e., very close approximation of edge of the lower/intermediate ground electrodes to the edge of the upper signal electrode), can be avoided considerably owing to the electrode thickness difference. Further, through control of the thickness, width and gap of the additional upper electrode structures, the effective microwave refractive index to reach the value of the effective optical refractive index can be obtained. Thus, it is possible to increase the bandwidth above 20 GHz.

Figure 3A:
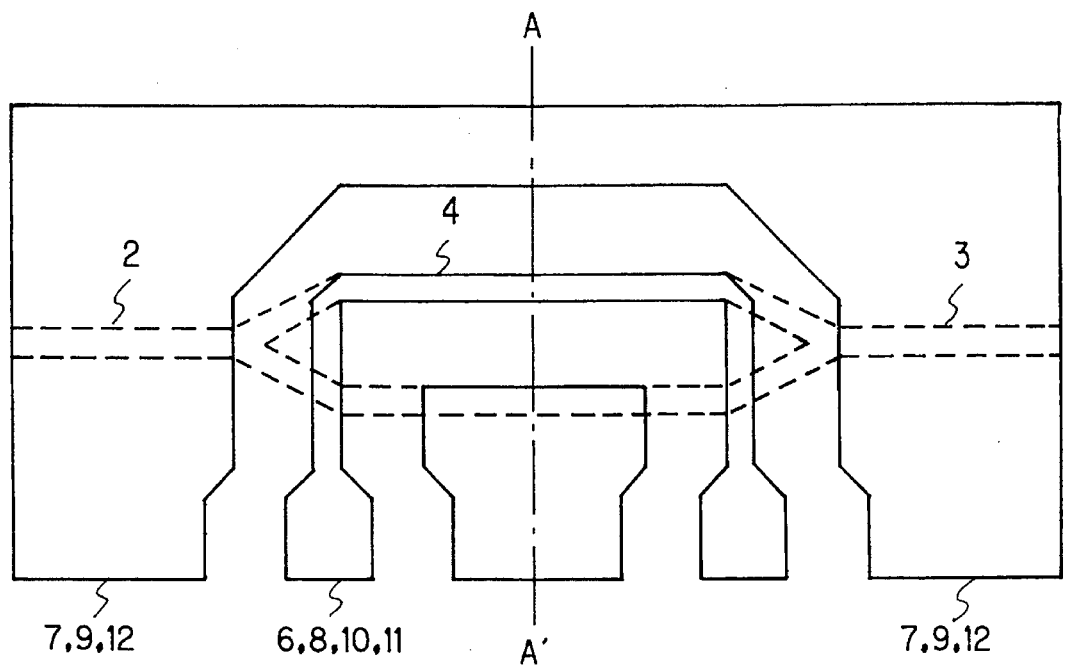
FIGS. 3A and 3B show a plan view and a sectional view taken along line A-A' in FIG. 3A of a third embodiment according to the present invention.
Figure 3B:
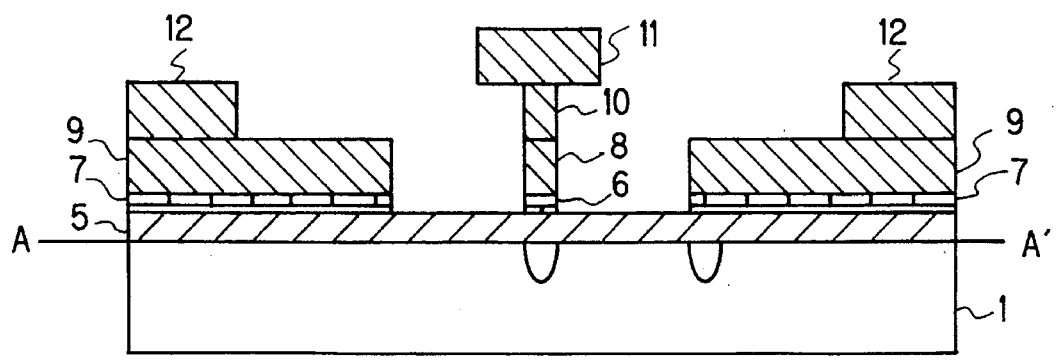

FIGS. 3A and 3B show a further basic structure of device according to the present invention, FIG. 3A being a plan view, and FIG. 3B being a sectional view taken along line A–A' in FIG. 3A. Waveguides 2 to 4 having a width of 5 to 15 μm and a depth of 3 to 15 μm are formed on a crystal substrate 1 having electro-optical effect. These waveguides are formed by depositing a titanium metal film having a width of 3 to 12 μm and causing diffusion of the film in the crystal substrate at 900° to 1,100° C. The waveguides comprise Y branch waveguides 2 and 3 and a phase shifter 4. They are covered by a buffer layer 5 (dielectric layer having a dielectric constant of 1.1 to 40) having a thickness of 0.3 to 10 μm. On the buffer layer, lower CPW electrode structures 6 and 7 are formed which comprise titanium metal (or chromium metal) of several hundred Å thickness and gold of several thousand Å in thickness. Then, intermediate CPW electrode structures 8 and 9 of gold are formed by electro-plating. The lower and intermediate CPW electrode structures comprise signal electrodes 6 and 8 having a width of 5 to 20 μm, a length of 10 to 70 mm and a thickness of 3 to 40 μm and two ground electrodes 7 and 9 having a width of 100 to 9,000 μm, a length of 10 to 70 mm and a thicknen of 3 to 40 μm. On the intermediate signal electrode 8 is formed an additional intermediate electrode 10 having the same dimensions. The additional upper electrode structures 11 and 12 comprise a signal electrode 11 having a width of 20 to 50 μm, a length of 10 to 70 mm and a thickness of 10 to 40 μm and two ground electrodes 12 having a width of 100 to 9,000 μm, a length of 10 to 70 mm and a thickness of 10 to 40 μm by electro-plating.

In this embodiment of the present invention, by the provision of the additional intermediate and upper signal electrodes formed on the lower and intermediate electrode structures, the overall signal electrode volume is increased to reduce the resistance and overall microwave attenuation, thus increasing the bandwidth. In this case, the provision of the additional intermediate electrode has an effect of avoiding the "edge" effect (i.e., very close approximation of edge of the lower and intermediate ground electrodes by the edge of the upper signal electrode). On the additional intermediate electrode an additional upper CPW electrode is formed as shown in connection with the above-described embodiments. The thickness difference between the additional upper CPW electrode structure and the intermediate CPW electrode structure, has an effect of avoiding the edge effect that causes characteristic impedance variations. Control of the thickness, width and gap of the additional upper electrode structure permits control of the effective microwave refractive index to reach the value of the effective optical refractive index. It is thus possible to increase the bandwidth above 20 GHz, thus permitting realization of a high speed, low drive voltage optical modulator.

Figure 4A:
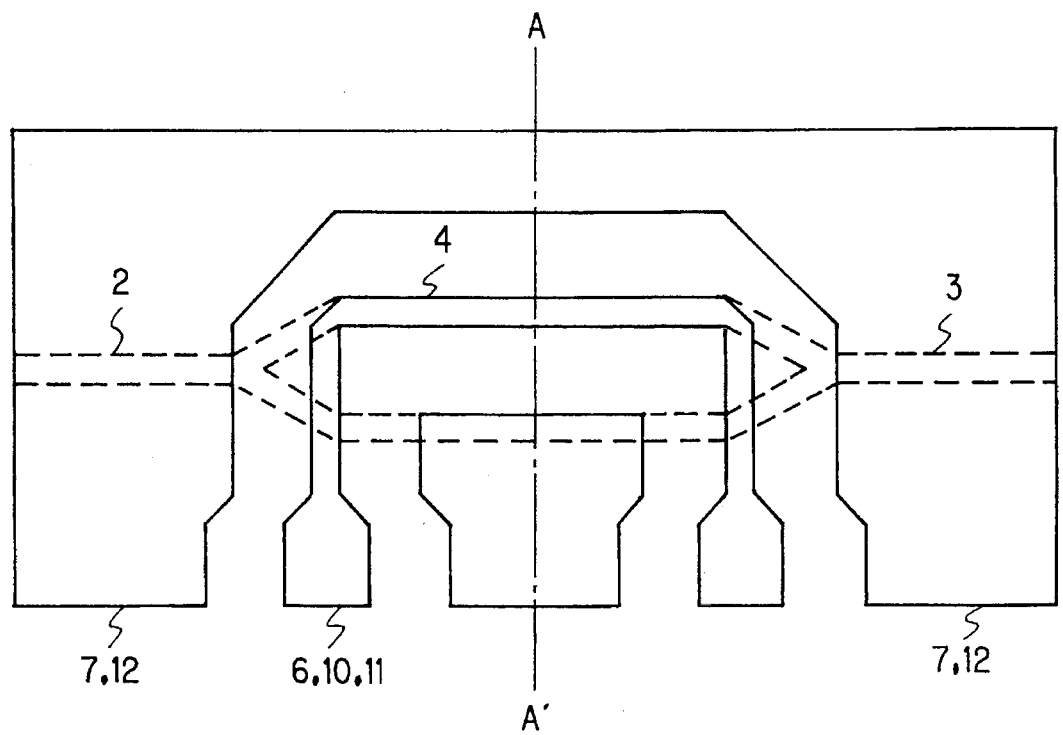
FIGS. 4A and 4B show a plan view and a sectional view taken along line A-A' in FIG. 4A of a fourth embodiment according to the present invention.
Figure 4B:
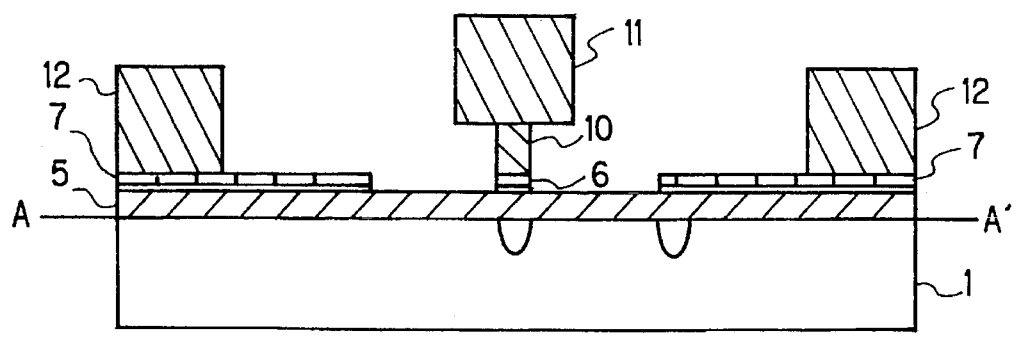
Figure 5A:
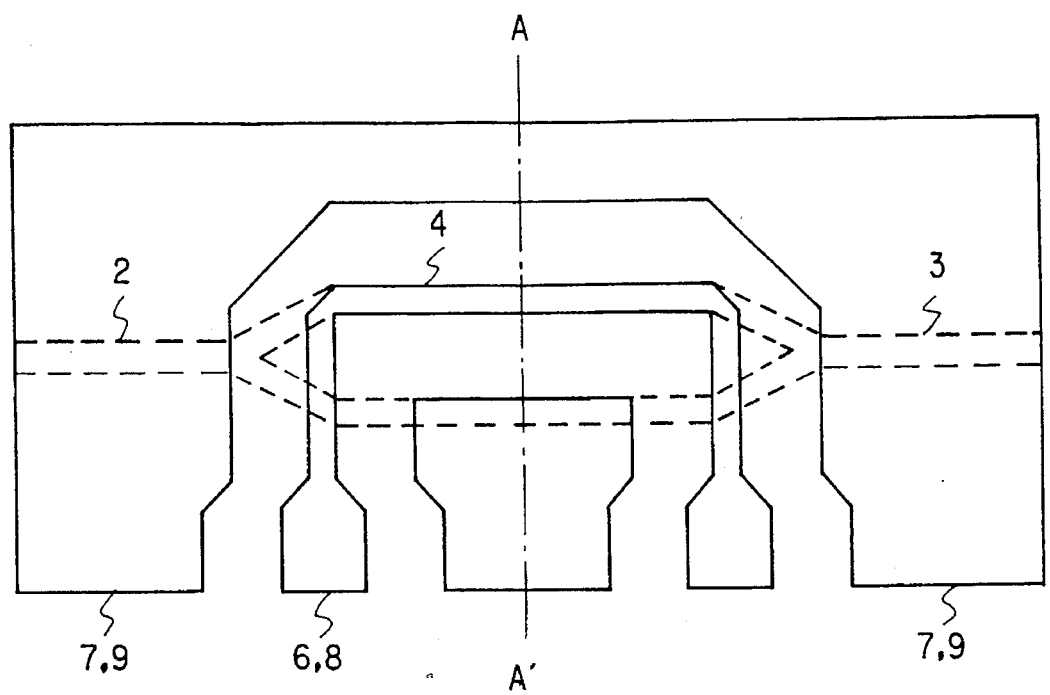
FIGS. 5A and 5B show a plan view and a sectional view taken along line A-A' in FIG. 5A of a prior art device.
Figure 5B:
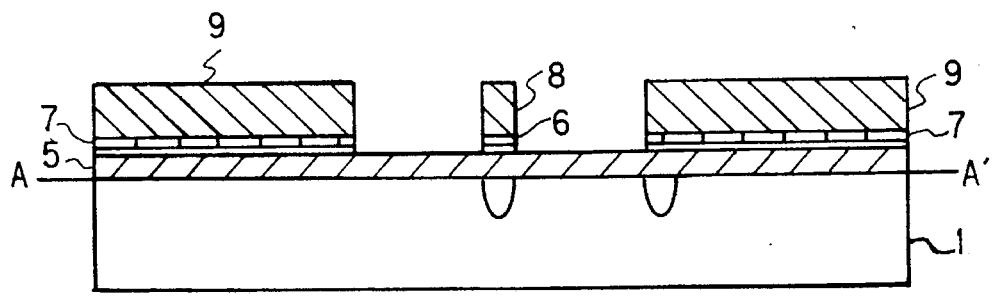

FIGS. 4A and 4B show a further basic structure of device according to the present invention, FIG. 4A being a plan view, and FIG. 4B being a sectional view taken along line A–A' in FIG. 4A. Waveguides 2 to 4 having a width of 5 to 15 μm and a depth of 3 to 15 μm are formed on a crystal substrate 1 having electro-optical effect. These waveguides are formed by depositing a titanium metal film having a width of 3 to 12 μm and causing diffusion of the film in the crystal substrate at 900° to 1,100° C. for 5 to 12 hours. The waveguides comprise Y branch waveguides 2 and 3 and a phase shifter 4. They are covered by a buffer layer (dielectric layer having a dielectric constant of 1.1 to 40) having a thickness of 0.3 to 10 μm. On the buffer layer are formed lower CPW electrode structures 6 and 7 comprising titanium metal (or chromium metal) of several hundred Å in thickness and gold several thousand Å in thickness. The lower electrode structures comprise a signal electrode 6 having a width of 5 to 20 μm and two ground electrode 7 having a width of 100 to 9,000 μm and a length of 10 to 70 mm. On the Lower signal electrode 5, an additional internal signal electrode 10 having the same dimensions. Additional upper electrode structures 11 and 12 are formed, which comprise a signal electrode 11 having a width of 20 to 50 μm, a depth of 10 to 70 mm and a thickness of 10 to 40 μm and two ground electrodes 12 having a width of 100 to 9,000 μm, a length of 10 to 70 mm and a thickness of 10 to 40 μm by electro-plating.

In this embodiment of the present invention, by the provision of the additional upper electrode structure on the lower electrode structure, the overall signal electrode volume is increased to reduce resistance and microwave wave attenuation, thus increasing the bandwidth. In this case, the lower signal electrode formed on the additional intermediate signal electrode has an effect of avoiding the "edge effect" (i.e., very close approximation of edge of the lower and intermediate ground electrodes by the edge of the upper signal electrode). On the additional intermediate signal electrode, an additional upper CPW electrode as shown in connection with the embodiments described above. Further, the thickness difference between the lower CPW electrode structure and the additional intermediate signal electrode permits avoiding the edge effect that causes characteristic impedance variation. Further, control of the thickness, width and gap of the additional upper electrode structure permits control of the effective microwave refractive index to reach the value of the effective optical refractive index. Thus, the bandwidth can be increased above 20 Ghz and it is possible to realize a high speed, low driving voltage optical modulator.

According to the present invention, it is possible to increase the bandwidth without adversely affecting the characteristic impedance. It is thus possible to obtain high speed, low drive voltage optical modulators and switches.

Changes in construction will occur to those skilled in the art and various apparently different modifications and embodiments may be made without departing from the scope of the invention. The matter set forth in the foregoing description and accompanying drawings is offered by way of illustration only. It is therefore intended that the foregoing description be regarded as illustrative rather than limiting.

What is claimed is:

1. An optical waveguide device comprising:
   at least one waveguide formed on a crystal substrate having electro-optical effect;
   a buffer layer having a dielectric constant of 1.1 to 40 formed on the waveguide; and
   a set of three electrodes in two stages of a lower and an intermediate electrode structure formed on the buffer layer;
   the electrode sets each including a signal electrode, two ground electrodes surrounding the signal electrode and an additional intermediate signal electrode having the same dimensions as the intermediate signal electrode.

2. An optical waveguide device comprising:
   at least one waveguide formed on a crystal substrate having electro-optical effect;
   a buffer layer having a dielectric constant of 1.1 to 40 formed on the waveguide; and
   a set of three electrodes having lower electrode structure formed on the buffer layer;
   the electrode set including a signal electrode, two ground electrodes surrounding the signal electrode and an additional upper electrode structure having the lower electrode structure;
   the additional upper electrode structure including a signal electrode and two ground electrodes surrounding the signal electrode;
   the upper signal electrode being wider than the lower signal electrode.

3. An optical waveguide device comprising:
   at least one waveguide formed on a crystal substrate having electro-optical effect;
   a buffer layer having a dielectric constant of 1.1 to 40 formed on the waveguide; and
   a set of three electrodes in two stages of a lower and an intermediate electrode structure formed on the buffer layer;
   the electrode sets including a signal electrode, two ground electrodes surrounding the signal electrode, and an additional intermediate signal electrode and an additional upper electrode structure, these additional electrode structures being formed on the intermediate electrode structure;
   the additional upper electrode structure including a signal electrode and two ground electrodes surrounding the signal electrode.

4. An optical waveguide device comprising:
   at least one waveguide formed on a crystal substrate having electro-optical effect;
   a buffer layer having dielectric constant of 1.1 to 40 formed on the waveguide; and
   a set of three electrodes of a lower electrode structure formed on the buffer layer;
   the lower electrode structure including a signal electrode, two ground electrodes surrounding the signal electrode, and an additional intermediate signal electrode and an additional upper electrode structure, these additional electrode structures being formed on the lower electrode structure; and
   the additional upper electrode structure including a signal electrode and two ground electrodes surrounding the signal electrode.

5. An optical waveguide device comprising:
   a crystal substrate having electro-optical effect;
   at least one waveguide having a width of 5 to 15 μm and a depth of 3 to 15 μm formed on the crystal substrate;
   a buffer layer of dielectric layer having a dielectric constant of 1.2 to 35 and covering the waveguide;
   lower CPW electrode structure of titanium metal or chromium metal of several hundred Å in thickness and gold of several thousand Å in thickness formed on the buffer layer, comprising signal electrode having a width of 5 to 20 μm, a length of 10 to 70 mm and a thickness of 3 to 40 μm and ground electrodes having a width of 100 to 9000 μm, a length of 10 to 70 mm and a thickness of 3 to 40 μm;
   intermediate CPW electrode structure of gold formed on the lower electrode structure, comprising a signal electrode having a width of 5 to 20 μm, a length of 10 to 70 mm and a thickness of 3 to 40 μm and ground electrodes having a width of 100 to 9000 μm, a length of 10 to 70 mm and a thickness of 3 to 40 μm; and
   an additional intermediate electrode having the same dimensions as that of the intermediate CPW electrode formed on the intermediate signal electrode.

6. An optical waveguide device comprising:
   a crystal substrate having electro-optical effect;
   at least one waveguide having a width of 5 to 15 μm and a depth of 3 to 15 μm formed on the crystal substrate;
   a buffer layer of dielectric layer having a dielectric constant of 1.2 to 35 and having a thickness of 0.3 to 10 μm, and covering the waveguide;
   lower CPW electrode structure of titanium metal or chromium metal of several hundred Å in thickness and gold of several thousand Å in thickness, comprising a signal electrode having a width of 5 to 20 mm and a length of 10 to 70 μm and two ground electrodes having a width of 100 to 9,000 μm and a length of 10 to 70 mm, and
   additional upper electrode structure formed on the lower electrode structure, comprising a signal electrode having a width of 20 to 50 μm, a length of 10 to 70 mm and a thickness of 10 to 40 μm and two ground electrodes having a width of 100 to 9,000 μm, a length of 10 to 70 mm and a thickness of 10 to 40 μm,
   the upper signal electrode being wider than the lower signal electrode.

7. An optical waveguide device comprising:
   a crystal substrate having electro-optical effect;
   at least one waveguide having a width of 5 to 15 μm and a depth of 3 to 15 μm formed on the crystal substrate;

a buffer layer of dielectric layer having a dielectric constant of 1.2 to 35 and having a thickness of 0.3 to 10 μm, and covering the waveguide;

lower CPw electrode structure of titanium metal or chromium metal of several hundred Å in thickness and gold of several thousand Å in thickness formed on the buffer layer, comprising a signal electrode having a width of 5 to 20 μm, a length of 10 to 70 mm and a thickness of 3 to 40 μm and two ground electrodes having a width of 100 to 9,000 μm, a length of 10 to 70 mm and a thickness of 3 to 40 μm;

intermediate CPW electrode structure of gold formed on the lower CPW electrode structure, comprising signal electrode having a width of 5 to 20 μm, a length of 10 to 70 mm and a thickness of 3 to 40 μm and two ground electrodes having a width of 100 to 9,000 μm, a length of 10 to 70 mm and a thickness of 3 to 40 μm;

an additional intermediate electrode formed on the intermediate signal electrode and having the same dimensions as that of the intermediate signal electrode; and additional upper electrode structure formed on the additional intermediate electrode, comprising a signal electrode having a width of 20 to 50 μm, a length of 10 to 70 mm and a thickness of 10 to 40 μm and two ground electrodes having a width of 100 to 9,000 μm, a length of 10 to 70 mm and a thickness of 10 to 40 μm.

8. An optical waveguide device comprising:

a crystal substrate having electro-optical effect;

at least one waveguide having a width of 5 to 15 μm and a depth of 3 to 15 μm formed on the crystal substrate;

a buffer layer of dielectric layer having a dielectric constant of 1.2 to 35 and having a thickness of 0.3 to 10 μm, and covering the waveguide;

lower CPW electrode structure of titanium metal or chromium metal of several hundred Å in thickness and gold of several thousand Å in thickness formed on the buffer layer, comprising a signal electrode having a width of 5 to 20 μm and two ground electrodes having a width of 100 to 9,000 μm and a length of 10 to 70 mm;

an additional internal signal electrode formed on the lower signal electrode, having the same dimensions as those of the lower signal electrode; and additional upper electrode structure formed on the additional internal signal electrode comprising a signal electrode having a width of 20 to 50 μm, a width of 10 to 70 mm and a thickness of 10 to 40 μm and two ground electrodes having a width of 100 to 9,000 μm, a length of 10 to 70 mm and a thickness of 10 to 40 μm.

* * * * *